Feb. 20, 1923.

L. F. STAFFORD.
BRACKET FOR MOUNTING AUTOMOBILE BUMPERS.
ORIGINAL FILED MAR. 17, 1920.

1,446,355.

INVENTOR
LEWIS F. STAFFORD.

Benjamin, Roadhouse & Lundy

ATTORNEYS.

Patented Feb. 20, 1923.

1,446,355

UNITED STATES PATENT OFFICE.

LEWIS F. STAFFORD, OF CHICAGO, ILLINOIS, ASSIGNOR TO STAFFORD SPRING GUARD CO., OF CHICAGO, ILLINOIS, A CORPORATION OF ILLINOIS.

BRACKET FOR MOUNTING AUTOMOBILE BUMPERS.

Original application filed March 17, 1920, Serial No. 366,499. Divided and this application filed July 29, 1920, Serial No. 399,773. Renewed July 24, 1922. Serial No. 577,178.

*To all whom it may concern:*

Be it known that I, LEWIS F. STAFFORD, a citizen of the United States, residing at Chicago, in the county of Cook and State of Illinois, have invented a new and useful Improvement in Brackets for Mounting Automobile Bumpers, of which the following is a specification.

This application is a division of the application for United States Letters Patent filed by me March 17, 1920, under Serial Number 366,499, for improvements in a "Bracket for mounting automobile bumpers," and has special reference to means for attaching or securing the supporting arms of a spring guard or bumper to the front portion of a motor vehicle. The principal object of the present invention is to provide a structure that is capable of being readily and easily assembled with the forward end portions of the sills of the chassis or other convenient portion of the vehicle. Another object of my invention resides in the fact that I have provided a bracket that will co-operate with and may be attached to stock parts to be found upon the type of vehicle known as the "Overland Light Four," whereby the mounting of the bracket and bumper in connection therewith renders a secure and rigid structure that is not susceptible to the vibration of the vehicle. Another object is the provision of a bumper attaching bracket that requires no mechanical operations or alterations of the parts for its attachment to the vehicle. A still further object is the provision of a securing structure that comprises a minimum of parts so that considerable expense and labor is eliminated both in assembling the bumper with the bracket and in securing the structure to the vehicle.

I prefer to accomplish the divers objects of my invention in substantially the manner hereinafter fully described, and as more particularly pointed out in the claims, reference being now had to the accompanying drawings that form a part of this specification, in which Figure 1 is a transverse vertical section of a side-sill of a vehicle chassis showing my bracket in end elevation attached thereto and the bumper arm in section.

Figure 1:
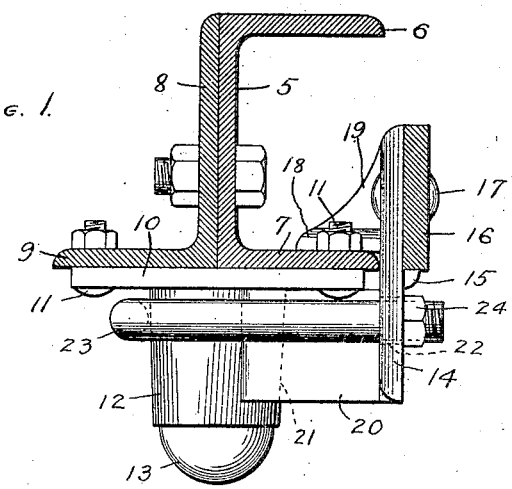
Figure 2:
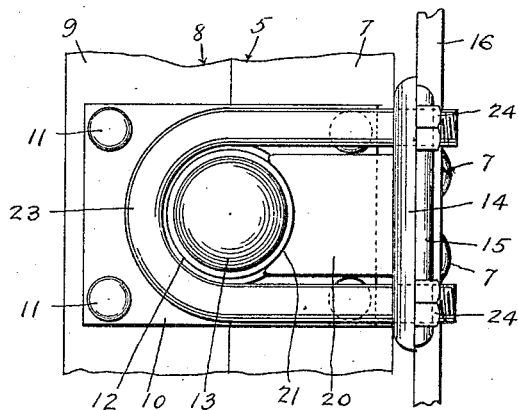
Figure 2 is a bottom plan of the structure illustrated in Figure 1.
Figure 3:
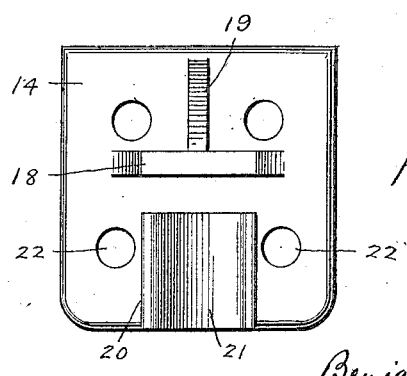
Figure 3 is a side elevation looking at the attaching side of the bracket for mounting a front guard or bumper.

By reference to Figures 1 and 2 of the drawings, it will be seen the side-sill of the vehicle chassis comprises a piece of channel metal 5 of substantially U-shape in cross-section that is disposed with the parallel flanges 6 and 7 in a horizontal plane and secured to the web of the channel in any suitable manner in an angle-metal piece 8, the web whereof is substantially the height of the channels against which it is placed, and has its single flange 9 positioned in the opposite direction to the lower flange 7 of channel 5. A rectangular plate or base 10 is secured to the underside of flanges 7 and 9 by headed bolts 11, and centrally of said base is a vertically elongated socket 12 in which a pad or cushion 13 of rubber or similar material is held. The structure above described is that of the well-known "Overland Light Four" type of vehicle, the pad of rubber being for the purpose of receiving the impact in the event the springs are so far compressed as to contact with the axle, and I have described this structure in detail because of the fact that these stock parts of the vehicle are utilized by me in securing my improved bracket to a chassis of this type.

The bracket I prefer to employ in securing the arms of the spring guard or bumper to the front portion of the chassis or vehicle consists of a cast metal plate 14 that is of substantially rectangular shape and is substantially vertically disposed when in position upon the sill. Upon the face of the plate farthest from the chassis structure I form a longitudinal rib 15 that provides a shelf or seat for the adjacent end portion of an arm 16 of the guard or bumper that is usually of strap metal and which I prefer to set vertically upon the shelf or rib and flat against the adjacent face of the plate to which latter said arm is secured by means of rivets 17 or in any other desired manner.

From the face of the plate opposite the shelf or rib projects a horizontally disposed lateral foot 18 that extends a distance longitudinally of the plate and is reinforced and strengthened by a bracing web 19 inclined upwardly from the outer portion of the foot toward the upper edge of the plate. Spaced below the horizontal plane of this foot and preferably centrally of the plate is a block 20 that is just wide enough to pass between the peripheral edges of the heads of adjacent securing bolts 11. The outer vertical edge of this block has a concave seat 21, the curvature whereof conforms with the shape of the adjacent portion of the elongated socket 12 so as to permit the face of the block to snugly fit against it. Suitably spaced apertures 22 are made in the bracket plate slightly below the horizontal plane of the heads of bolts 11 through which apertures the threaded ends of a U-shaped yoke or clip 23 are passed, while the curved connecting portion of the clip passes around the segment of the socket that is unengaged by or in opposite seat 21 in the block. It will be noted the space between foot 18 and the upper face of block 20 is substantially the same as the thickness of flange 7 of the channel, and this space is adapted to receive this flange when the bracket is assembled on the sill. After the bracket is positioned on the flange of the sill with seat 21 of the block against socket 12, the structure is clamped in place by nuts 24 screwed on the threaded ends of the clip arms thus drawing the block tightly against the socket and securing the bracket in a rigid position. Thus it will be seen that the bracket cannot move longitudinally of the sill nor laterally thereof so that the guard or bumper arms carried by a pair of brackets are securely and rigidly connected to the vehicle, and any impact received by the guard or bumper will be transmitted through arm 16 directly to the chassis frame without permitting the bracket to move or slip in any direction.

What I claim as new is:

1. The combination with a chassis frame having sills of angular section, and an element projecting from the underside of said frame, of bumper-securing means comprising a plate, a lateral foot on one face of said plate, a block projecting from said plate below said foot and the outer end of which block engages the element on said chassis frame, and a U-shaped clip the arms whereof engage said plate and the connecting portion of said clip surrounds the portion of the chassis element opposite said block.

2. A bracket for mounting a guard or bumper on a vehicle chassis consisting of a plate, a foot on one face thereof, a block upon the lower portion of the plate below and spaced from said foot the outer portion of said block engageable with a lateral element of the chassis, and a U-shaped clip carried by said plate the connecting portion of which clip surrounds and engages the portion of the chassis element opposite said block.

3. The combination with a chassis frame having sills of angular section, and a tubular stub projecting from the underside of said frame, of bumper-securing means comprising a plate, a lateral foot on one face of said plate, a block projecting from said plate below said foot and the outer end of which block has a concave recess engaging a portion of the stub on the chassis frame, and a U-shaped clip the arms whereof engage said plate and the connecting portion of said clip surrounds the portion of the chassis element opposite said block.

4. A bracket for mounting a guard or bumper on a vehicle chassis consisting of a plate, a foot on one face thereof, a block upon the lower portion of the plate below and spaced from said foot the outer portion of said block having a concave recess engageable with a correspondingly shaped element projecting from the adjacent portion of the chassis, and a U-shaped clip carried by said plate the connecting portion of which slip surrounds and engages the portion of the chassis element opposite said block.

5. The combination with a chassis frame having sills of angular section one of the flanges being horizontally disposed at the lower edge of the sill and a lateral element below said flange, of bumper-securing means comprising a plate to which an arm of the bumper is secured, a lateral foot on one face of said plate, a block projecting from said plate below and spaced from said foot whereby a recess is provided between said parts to receive the flange of the sill, the outer portion of said block constructed to receive and partially embrace the lateral element of the chassis, and a clip the arms whereof are connected to said plate and the outer portion of said clip surrounds the portion of the chassis element opposite said block.

Signed at Chicago, county of Cook and State of Illinois, this 23rd day of July, 1920.

LEWIS F. STAFFORD.